United States Patent
Zhu et al.

(10) Patent No.: US 12,477,317 B2
(45) Date of Patent: Nov. 18, 2025

(54) ROAMING METHOD, APPARATUS, AND SYSTEM

(71) Applicant: HUAWEI TECHNOLOGIES CO., LTD., Guangdong (CN)

(72) Inventors: Fangyuan Zhu, Beijing (CN); Yan Li, Beijing (CN); Jianning Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 405 days.

(21) Appl. No.: 17/851,226

(22) Filed: Jun. 28, 2022

(65) Prior Publication Data

US 2022/0330005 A1   Oct. 13, 2022

Related U.S. Application Data

(63) Continuation of application No. PCT/CN2019/129833, filed on Dec. 30, 2019.

(51) Int. Cl.
*H04W 8/12* (2009.01)
*H04W 60/06* (2009.01)
*H04W 84/04* (2009.01)

(52) U.S. Cl.
CPC ............. *H04W 8/12* (2013.01); *H04W 60/06* (2013.01); *H04W 84/042* (2013.01)

(58) Field of Classification Search
CPC ..... H04W 8/12; H04W 60/06; H04W 84/042; H04W 48/12; H04W 48/18
USPC ......................................................... 370/433
See application file for complete search history.

(56) References Cited

U.S. PATENT DOCUMENTS

| | | | |
|---|---|---|---|
| 9,668,183 | B2 | 5/2017 | Bhat et al. |
| 2012/0100848 | A1 | 4/2012 | Miklos |
| 2015/0245256 | A1* | 8/2015 | Kiss ...................... H04W 60/04 455/436 |
| 2016/0066235 | A1 | 3/2016 | Bhat et al. |
| 2019/0132725 | A1* | 5/2019 | Venkataramanan .. H04W 24/08 |

(Continued)

FOREIGN PATENT DOCUMENTS

| | | | |
|---|---|---|---|
| CN | 1780477 A | * | 5/2006 |
| CN | 105657791 A | | 6/2016 |

(Continued)

OTHER PUBLICATIONS

3GPP TS 29.272 V16.1.0 (Dec. 2019), 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol(Release 16), 181 pages.

(Continued)

*Primary Examiner* — Rownak Islam

(57) ABSTRACT

Embodiments of this application provide a roaming method. The method includes: A terminal device accesses a second PLMN when the terminal device cannot access a first PLMN, where a dynamic roaming agreement between the second PLMN and the first PLMN is enabled; the terminal device receives indication information from the second PLMN, where the indication information is used to indicate to disable the dynamic roaming agreement between the second PLMN and the first PLMN; and the terminal device sends an access request message to the first PLMN based on the indication information.

17 Claims, 7 Drawing Sheets

(56) References Cited

U.S. PATENT DOCUMENTS

| | | | | |
|---|---|---|---|---|
| 2021/0282081 | A1* | 9/2021 | Kamata | H04W 60/06 |
| 2022/0217553 | A1* | 7/2022 | Kim | H04W 24/04 |
| 2022/0377528 | A1* | 11/2022 | Chandramouli | H04W 60/06 |

FOREIGN PATENT DOCUMENTS

| | | |
|---|---|---|
| CN | 107736054 A | 2/2018 |
| CN | 107911812 A | 4/2018 |
| WO | 2016186400 A1 | 11/2016 |
| WO | 2019122494 A1 | 6/2019 |

OTHER PUBLICATIONS

3GPP TS 22.261 V17.1.0 (Dec. 2019), 3rd Generation Partnership Project; Technical Specification Group Services and System Aspects; Service requirements for the 5G system; Stage 1(Release 17), 83 pages.

3GPP TS 23.003 V16.1.0 (Dec. 2019), 3rd Generation Partnership Project; Technical Specification Group Core Network and Terminals; Numbering, addressing and identification(Release 16), 139 pages.

3GPP TR 22.831 V17.1.0 (Dec. 2019), 3rd Generation Partnership Project; Technical Specification Group Services and System Aspects; Study on Support for Minimization of Service Interruption(Release 17), 19 pages.

3GPP TS 23.122 V16.4.0 (Dec. 2019), 3rd Generation Partnership Project; Technical Specification Group Core Network and Terminals; Non-Access-Stratum (NAS) functions related to Mobile Station (MS) in idle mode(Release 16), 80 pages.

3GPP TS 23.501 V16.3.0 (Dec. 2019), 3rd Generation Partnership Project; Technical Specification Group Services and System Aspects; System architecture for the 5G System (5GS); Stage 2(Release 16), 417 pages.

3GPP TS 23.502 V16.3.0 (Dec. 2019), 3rd Generation Partnership Project; Technical Specification Group Services and System Aspects; Procedures for the 5G System (5GS); Stage 2(Release 16), 558 pages.

3GPP TS 24.501 V16.3.0 (Dec. 2019), 3rd Generation Partnership Project; Technical Specification Group Core Network and Terminals; Non-Access-Stratum (NAS) protocol for 5G System (5GS); Stage 3(Release 15), 643 pages.

3GPP TS 33.501 V16.0.0 (Sep. 2019), 3rd Generation Partnership Project; Technical Specification Group Services and System Aspects; Security architecture and procedures for 5G system(Release 16), 196 pages.

3GPP TS 38.304 V15.5.0 (Sep. 2019), 3rd Generation Partnership Project; Technical Specification Group Radio Access Network; NR; User Equipment (UE) procedures in Idle mode and RRC Inactive state(Release 15), 29 pages.

3GPP TS 38.331 V15.7.0 (Sep. 2019), 3rd Generation Partnership Project; Technical Specification Group Radio Access Network; NR; Radio Resource Control (RRC) protocol specification(Release 15), 527 pages.

LG Electronics, KT Corp, LG Uplus, SK Telecom, ETRI, Gemalto, ITL, KRRI, Samsung, Study on Support for Minimization of service interruption. 3GPP TSG SA WG1 Meeting #85 , Tallinn, Estonia, Feb. 18-22, 2019 , S1-190525, 3 pages.

Huawei, Use case for HPLMN failure with part of CN still working. 3GPP TSG-SA WG1 Meeting #86, Suzhou, China, 6 May 10, 2019, S1-191424, 2 pages.

Huawei, Use case on access control for backup Plmn. 3GPP TSG-SA WG1 Meeting #86 , Suzhou, China, 6 May 10, 2019, S1-191453, 2 pages.

Huawei, Use case on backup PLMN for international roamer. 3GPP TSG-SA WG1 Meeting #86 , Suzhou, China, 6 May 10, 2019, S1-191585, 2 pages.

LG Electronics, MINT Status Update Support for Minimization of service Interruption. 3GPP TSG-SA WG1 Meeting #88, Reno, USA, Nov. 18-22, 2019, S1-193256, 7 pages.

Huawei, Use case for HPLMN completely failure. 3GPP TSG-SA WG1 Meeting #86, Suzhou, China, May 6-10, 2019, S1-191101, 2 pages.

* cited by examiner

ROAMING METHOD, APPARATUS, AND SYSTEM

CROSS-REFERENCE TO RELATED APPLICATION

This application is a continuation of International Application No. PCT/CN2019/129833 filed on Dec. 30, 2019. The disclosure of the aforementioned application is hereby incorporated by reference in its entirety.

TECHNICAL FIELD

Embodiments of this disclosure relate to the field of communication technologies, and in particular, to a roaming method, an apparatus, and a system.

BACKGROUND

In an existing communication network, when a fault occurs in a home public land mobile network (HPLMN) corresponding to a terminal device, the terminal device cannot access the HPLMN. Generally, other operator networks may exist in an area in the HPLMN in which the fault occurs. However, a roaming agreement may not be signed between these operator networks and the HPLMN. In this case, a method for the terminal device to access the other operator networks is not provided in current technologies.

SUMMARY

Embodiments provide a roaming method, an apparatus, and a system, to enable, when a fault occurs in an HPLMN corresponding to a terminal device, the device to access another operator network in an area in which the fault occurs.

According to a first aspect, an embodiment provides a roaming method in which a terminal device accesses a second PLMN in accordance with the provisions of a dynamic roaming agreement when the terminal device cannot access a first PLMN, as can arise from a fault experienced by the PLMN, wherein the dynamic roaming agreement between the second PLMN and the first PLMN is enabled. When the first PLMN recovers from the fault, the terminal device receives indication information from the second PLMN indicating conditions allow for disabling the dynamic roaming agreement between the second PLMN and the first PLMN, and the terminal device sends an access request message to the first PLMN based on the indication information.

In a possible implementation, that the terminal device receives indication information from the second PLMN includes: The terminal device receives a broadcast message from the second PLMN, where the broadcast message includes the indication information.

In a possible implementation, the broadcast message further includes identification information of the first PLMN, and/or information of an area that is in the second PLMN and that the terminal device is not allowed to access.

In a possible implementation, the method further includes: The terminal device deregisters from the second PLMN.

In a possible implementation, that the terminal device receives indication information from the second PLMN includes: The terminal device receives a deregistration request message from the second PLMN, where the deregistration request message includes the indication information.

In a possible implementation, the deregistration request message further includes information of an area that is in the second PLMN and that the terminal device is not allowed to access.

In a possible implementation, the method further includes: Before the terminal device accesses the second PLMN, the terminal device receives, from the second PLMN, indication information used to indicate to enable the dynamic roaming agreement between the second PLMN and the first PLMN.

In a possible implementation, the method further includes: The terminal device obtains information of the second PLMN before the terminal device accesses the second PLMN.

In a possible implementation, the information of the second PLMN further includes at least one of the following information: an access technology type by using which the terminal device is allowed to access the second PLMN, information of an area that is in the second PLMN and that the terminal device is allowed to access, or priority information of the second PLMN.

According to a second aspect, an embodiment provides a roaming method, including: A core network element in a second PLMN obtains first indication information when a terminal device cannot access a first PLMN, where the first indication information is used to indicate to enable a dynamic roaming agreement between the second PLMN and the first PLMN; and the core network element sends the first indication information to the terminal device.

In a possible implementation, that a core network element obtains first indication information includes: The core network element obtains a first notification message, where the first notification message includes the first indication information.

In a possible implementation, the first notification message further includes information of the first PLMN, and the information of the first PLMN includes identification information of the first PLMN.

In a possible implementation, the first notification message further includes at least one of the following information: an access technology type by using which the terminal device is allowed to access the second PLMN, information of an area that is in the second PLMN and that the terminal device is allowed to access, or priority information of the second PLMN.

In a possible implementation, the method further includes: The core network element determines an access network device based on the information of the area that is in the second PLMN and that the terminal device is allowed to access, where the access network device is located in the area that is in the second PLMN and that the terminal device is allowed to access.

In a possible implementation, the core network element is an access management network element, and that the core network element obtains a first notification message includes: The access management network element obtains the first notification message from a network management network element by using a network exposure function network element in the second PLMN.

In a possible implementation, the method further includes: The core network element obtains second indication information, where the second indication information is used to indicate to disable the dynamic roaming agreement between the second PLMN and the first PLMN; and the core network element sends the second indication information to the terminal device by using the access network device.

According to a third aspect, an embodiment provides a communication apparatus, including: a processing unit, configured to enable the communication apparatus to access a second PLMN when the communication apparatus cannot access a first PLMN, where a dynamic roaming agreement between the second PLMN and the first PLMN is enabled; a receiving unit, configured to receive indication information from the second PLMN, where the indication information is used to indicate to disable the dynamic roaming agreement between the second PLMN and the first PLMN; and a sending unit, configured to send an access request message to the first PLMN based on the indication information.

In a possible implementation, the communication apparatus may be a terminal device.

According to a fourth aspect, an embodiment provides a communication apparatus, including: a receiving unit, configured to obtain first indication information when a terminal device cannot access a first PLMN, where the first indication information is used to indicate to enable a dynamic roaming agreement between a second PLMN and the first PLMN, and the communication apparatus is an apparatus in the second PLMN; and a sending unit, configured to send the first indication information to the terminal device.

In a possible implementation, the receiving unit is configured to obtain a first notification message, where the first notification message includes the first indication information.

In a possible implementation, the first notification message further includes information of the first PLMN, and the information of the first PLMN includes identification information of the first PLMN.

In a possible implementation, the first notification message further includes at least one of the following information: an access technology type by using which the terminal device is allowed to access the second PLMN, information of an area that is in the second PLMN and that the terminal device is allowed to access, or priority information of the second PLMN.

In a possible implementation, the communication apparatus further includes a processing unit, configured to determine an access network device based on the information of the area that is in the second PLMN and that the terminal device is allowed to access, where the access network device is located in the area that is in the second PLMN and that the terminal device is allowed to access.

In a possible implementation, the receiving unit is configured to obtain the first notification message from a network management network element by using a network exposure function network element in the second PLMN.

In a possible implementation, the receiving unit is further configured to obtain second indication information, where the second indication information is used to indicate to disable the dynamic roaming agreement between the second PLMN and the first PLMN; and the sending unit is further configured to send the second indication information to the terminal device by using the access network device.

In a possible implementation, the communication apparatus may be a core network element, for example, an access management network element.

In this application, the second PLMN and the first PLMN have a same mobile country code, and a mobile network code of the second PLMN is different from a mobile network code of the first PLMN.

In this application, the dynamic roaming agreement between the second PLMN and the first PLMN includes: if the terminal device can access the first PLMN, a roaming agreement between the second PLMN and the first PLMN is disabled; if the terminal device cannot access the first PLMN, a roaming agreement between the second PLMN and the first PLMN is enabled.

The first PLMN is a home public land mobile network HPLMN, and the second PLMN is a visited public land mobile network VPLMN.

According to a fifth aspect, this disclosure provides a communication apparatus, including a processor. The processor reads computer-readable instructions stored in a memory, to enable the communication apparatus to perform the method in any one of the first aspect or the possible implementations of the first aspect.

According to a sixth aspect, this disclosure provides a communication apparatus, including a processor. The processor reads computer-readable instructions stored in a memory, to enable the communication apparatus to perform the method in any one of the second aspect or the possible implementations of the second aspect.

According to a seventh aspect, this disclosure provides a communication system. The communication system includes the communication apparatus in the fourth aspect or the sixth aspect and an access network device connected to the communication apparatus. The communication apparatus communicates with a terminal device by using the access network device.

According to an eighth aspect, this disclosure provides a computer-readable storage medium, including computer-readable instructions. When the instructions are run on a computer, the computer is enabled to perform the method in the first aspect or the second aspect.

According to a ninth aspect, this disclosure provides a computer program product, including a computer program. When the program is run on a computer, the computer is enabled to perform the method in the first aspect or the second aspect.

According to a tenth aspect, this disclosure provides a chip or a chip system. The chip or the chip system includes at least one processor and a communication interface. The communication interface is coupled to the at least one processor. The processor is configured to run a computer program or instructions to perform the method in any one of the first aspect or the possible implementations of the first aspect. The communication interface is configured to communicate with a module other than the chip.

DESCRIPTION OF EMBODIMENTS

Figure 1:
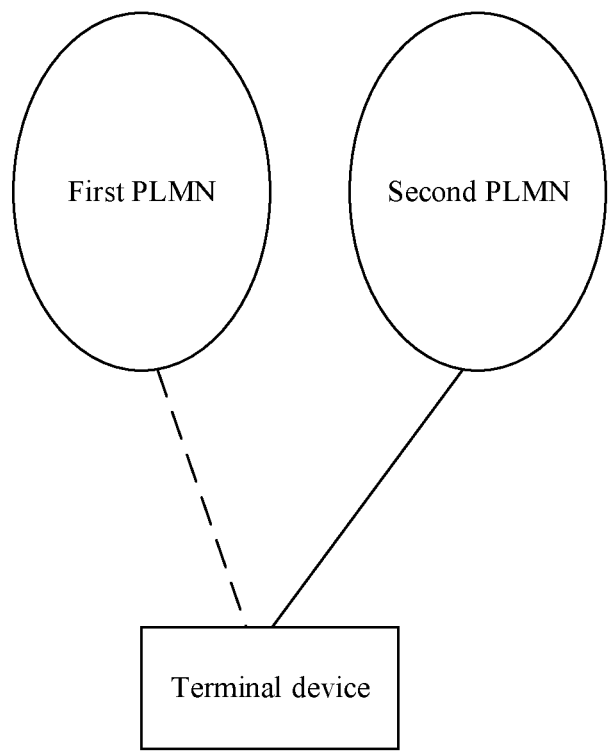
FIG. 1 is a schematic diagram of a scenario to which an embodiment is applicable.

To clearly describe technical solutions in embodiments of this application, words such as "first" and "second" are used in embodiments of this application to distinguish similar content. For example, a first PLMN and a second PLMN are merely intended to distinguish different PLMNs, but not to limit a sequential order thereof. A person skilled in the art may understand that the words such as "first" and "second" do not limit a quantity and an execution sequence, and the words such as "first" and "second" do not indicate a definite difference.

It should be noted that, in this disclosure, words such as "example" or "for example" are used to represent an illustrative example, an illustration, or a description. Any embodiment or design scheme described as "example" or "for example" in this disclosure should not be interpreted as being more preferred or having more advantages than another embodiment or design solution. Use of the words such as "example" or "for example" is intended to present a related concept in a specific manner.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of the network architecture and emergence of a new service scenario, the technical solutions provided in embodiments of this application are also applicable to similar technical problems.

In this disclosure, "at least one" refers to one or more, and "a plurality of" refers to two or more. The term "and/or" describes an association relationship between associated objects and represents that three relationships may exist. For example, A and/or B may represent the following cases: Only A exists, both A and B exist, and only B exists, where A and B may be singular or plural. A character "/" generally indicates an "or" relationship between the associated objects. "At least one item (piece) of the following" or a similar expression thereof indicates any combination of the items, including any combination of singular items (pieces) or plural items (pieces). For example, at least one of a, b, or c may indicate: a, b, c, a and b, a and c, b and c, or a, b, and c, where a, b, and c may be singular or plural.

In a communication network, to obtain a service provided by a network, a terminal device needs to select a PLMN, camp on an appropriate cell, and successfully complete a registration process. Based on an operation mode, PLMN selection may be classified into two manners: an automatic mode and a manual mode.

Automatic mode: The automatic mode is that the terminal device automatically attempts selection from a PLMN with the highest priority based on priority ranks of PLMNs in a PLMN list. If the attempt succeeds, the terminal device selects an appropriate cell in the PLMN to camp on. If selection of a PLMN with a high priority fails, the terminal device attempts to select a PLMN with a secondary priority until the terminal device can successfully register with a PLMN.

Manual mode: The manual mode is that the terminal device presents a list of currently available PLMNs (for example, presented according to priority ranks) to a user, and the user selects an appropriate PLMN from the list of PLMNs to access.

In the automatic mode, prior information-based PLMN selection and initial PLMN selection may be classified based on whether prior information exists.

The prior information-based PLMN selection means that the terminal device records a PLMN (Registered PLMN, RPLMN) with which the terminal device registers most recently (for example, currently). When powered on next time or returning to a coverage area, the terminal device selects the RPLMN with the highest priority. If the RPLMN is unavailable, the terminal device selects a PLMN using an initial selection method.

The initial PLMN selection is that the terminal device selects a PLMN based on various PLMNs and priorities thereof that are recorded in a universal subscriber identity module (USIM) when not having the prior information. In a possible implementation, these PLMNs may be ranked in descending order based on the following priorities: (1) an HPLMN; (2) an equivalent HPLMN (EHPLMN); (3) a user controlled PLMN (User Controlled PLMN); (4) an operator controlled PLMN; (5) a PLMN selected based on a quality of service requirement; and (6) another PLMN. The user controlled PLMN means that the user of the terminal device may select a corresponding PLMN based on preference. The operator controlled PLMN means that when producing a SIM, an operator stores a PLMN of another operator that has signed a roaming agreement with the operator in the SIM of the terminal device, and the terminal device may select, based on the stored PLMN, a corresponding PLMN to access. The PLMN selected based on the quality of service requirement may be indication information used to indicate the terminal device to select a corresponding PLMN based on the quality of service requirement, for example, select a network with a reference signal received power (Reference Signal Received Power, RSRP) not less than—110 dBm. If none of the PLMNs in (1) to (5) can be accessed, the terminal device may select another PLMN that can be accessed.

If there are a plurality of optional PLMNs in an area in which the terminal device is located, but a registration attempt of the terminal device on each of the plurality of optional PLMNs fails, these PLMNs are set by the terminal device as PLMNs that are forbidden from being accessed. For example, if the terminal device receives cause information of a PLMN not allowed "PLMN not allowed", the terminal device adds the PLMN to a forbidden PLMN "forbidden PLMN" list in a SIM.

Generally, if a plurality of operators in a same area do not sign a roaming agreement, a terminal device of an operator fails to access a PLMN of another operator that does not sign the roaming agreement, and the terminal device adds the failed PLMN to the forbidden PLMN list. If the terminal device is in an automatic network selection mode, the terminal device shall not attempt to access any PLMN in the forbidden PLMN list subsequently. If the user manually attempts to access the PLMN subsequently and registration succeeds, the terminal device deletes the PLMN from the forbidden PLMN list. In the automatic network selection mode or the manual network selection mode, once the forbidden PLMN list is generated, even if the terminal device is powered off or a SIM card is removed, a PLMN in the forbidden PLMN list is not automatically deleted.

FIG. 1 is a schematic diagram of a scenario to which an embodiment is applicable. When a terminal device cannot access a first PLMN (for example, a fault occurs in the first PLMN), the terminal device may access a second PLMN based on a dynamic roaming agreement between the first PLMN and the second PLMN.

In a possible implementation, the first PLMN is an HPLMN, and the second PLMN is a visited public land mobile network (VPLMN).

In a possible implementation, the first PLMN and the second PLMN have a same mobile country code (MCC), and a mobile network code (MNC) of the first PLMN is different from a mobile network code of the second PLMN.

In embodiments of this application, that a fault occurs in the PLMN may mean that the fault occurs in an area that is in the PLMN and in which the terminal device is located, and does not necessarily mean that the fault occurs in the entire PLMN.

Figure 2:
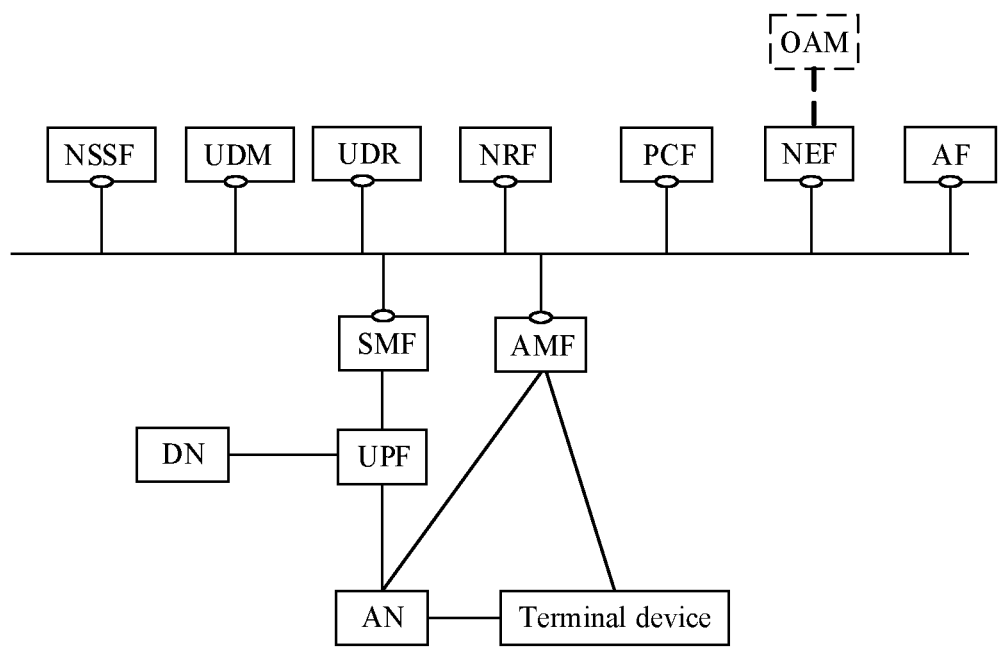
FIG. 2 is a schematic diagram of a 5G network to which an embodiment is applicable.

FIG. 2 is a schematic diagram of a 5G network to which an embodiment of this application is applicable. The 5G network in FIG. 2 uses a service-based network architecture. Another 5G network architecture may also be used in embodiments of this application. This is not limited herein.

The 5G network architecture shown in FIG. 2 includes an access network (AN) node and a plurality of network function (NF) network elements. The plurality of NF network elements may include: a user plane function (UPF) network element, an access and mobility management function (AMF) network element, a session management function (SMF) network element, a policy control function (PCF) network element, a network slice selection function (NSSF) network element, a unified data management (UDM) network element, a network repository function (NRF) network element, a network exposure function (NEF) network element, a data storage function network element (UDR), a network management network element, or the like. In addition, the network architecture may further include a terminal device, a data network (data network, DN) node, an application function (AF) network element, or the like.

In embodiments of this application, the network management network element may be an operation administration and maintenance (OAM) system. The OAM system may communicate with another NF network element by using the NEF network element. Alternatively, the OAM system may directly communicate with another NF network element. This is not limited in embodiments of this application.

Each network element in FIG. 2 may be a network element in a hardware device, may be a software function running on dedicated hardware, or may be a virtualization function instantiated on a platform (for example, a cloud platform).

It should be noted that, in the network architecture shown in FIG. 2, network elements included in the entire network architecture are described as only examples. In embodiments of this application, the network elements included in the network architecture are not limited. For example, in embodiments of this application, the network architecture may include any one or more of all the network elements shown in FIG. 2.

The terminal device is an electronic device having a wireless communication function, and may be deployed on land, including an indoor device, an outdoor device, a handheld device, or a vehicle-mounted device; or may be deployed on a water surface (such as a ship); or may be deployed above ground, such as in air (for example, on aircraft, a balloon, or a satellite). The terminal device may be user equipment (UE), a mobile phone, a pad, a computer having a wireless transceiver function, a virtual reality (VR) terminal device, an augmented reality (AR) terminal device, a wireless terminal device in industrial control, a wireless terminal device in self driving, a wireless terminal device in remote medical (remote medical), a wireless terminal device in a smart grid, a wireless terminal device in transportation safety, a wireless terminal device in a smart city, a wireless terminal device in a smart home, or the like.

The AN node may be a device providing wireless access for the UE, and includes but is not limited to an evolved NodeB (eNB for short), a wireless-fidelity access point (Wi-Fi AP), a worldwide interoperability for microwave access base station (WiMAX BS), a base station (such as a gNodeB or a gNB) in a 5G network, or the like. Alternatively, the AN node may be a (RAN) node or an access node in a subsequently evolved network.

The UPF network element may process a packet. For example, the UPF may perform functions such as user data forwarding, routing, data statistics collection, rate limiting, and statistics reporting.

The AMF network element may perform mobility management in a mobile network, for example, user location update, user network registration, and user handover. The AMF network element may access non-access stratum (NAS) signaling (including session management (SM) signaling) of the UE through an N1 interface, or may access RAN signaling through an N2 interface, to complete a user registration procedure, SM signaling forwarding, and mobility management. The AMF network element may forward a message between the SMF network element and the UE.

The SMF network element may perform session management, such as session establishment, session modification, and session release, in the mobile network.

The PCF network element may manage a user policy, including a mobility-related policy and a protocol data unit (PDU) session-related policy, such as a quality of service (QoS) policy and a charging policy.

The NSSF network element is used to select a network slice. The network slice is a logically isolated network used for supporting a specific network capability and network feature, and may include an entire network in an end-to-end (E2E) manner, or some network functions may be shared by a plurality of network slices. The network slice is a key technology for meeting differentiated requirements of a network in a fifth 5G mobile communication technology proposed by 3GPP. Generally, network features of different network slices are different, and the network slices need to be isolated from each other to prevent mutual interference. For example, a network slice of an augmented reality (AR) service or a virtual reality (VR) service requires high bandwidth and a low delay. A network slice of an internet of things (IoT) service requires support of access of massive terminals, but requires low bandwidth and has no requirement on a delay.

The UDM network element is responsible for managing information such as user subscription data, and the UDM network element may provide the user subscription data for a network element such as the AMF and the SMF.

The UDR network element stores structured data of a network, including user subscription data information and a user policy. The UDM may read terminal subscription data from the UDR, and the PCF may read user policy information from the UDR. The UDR may also be divided into two parts, to be respectively combined with the UDM network element and the PCF network element, and is not independently deployed.

The NRF network element stores registration information of another function network element, and provides, based on the registration information, a service of searching and discovering each other between network function network elements.

The NEF network element is responsible for authorizing and controlling an exposure service and capability of a network. An AF network element located outside an operator network may provide network data for the network by using the NEF network element, or may obtain the exposure service and data of the network by using the NEF.

The DN is used to provide a data service for the UE, and may be an access destination of a PDU session of the user. The DN may be a PDN network such as Internet (internet) or an IP multimedia service (IP multimedia Service, IMS).

The AF network element may send a request to affect a routing policy of the SMF, and is responsible for selecting and relocating an application in the local DN. The AF mainly performs a dynamic policy or charging control on forwarding plane behavior. The services need the dynamic policy and the charging control. The AF transmits dynamic session information required by the PCF.

In embodiments, both the first PLMN and the second PLMN may use the architecture shown in FIG. 2. Certainly, the first PLMN and the second PLMN may also use another network architecture, for example, an evolved packet core network (Evolved Packet Core network, EPC) architecture or a future evolved system architecture. This is not limited herein.

Figure 3:
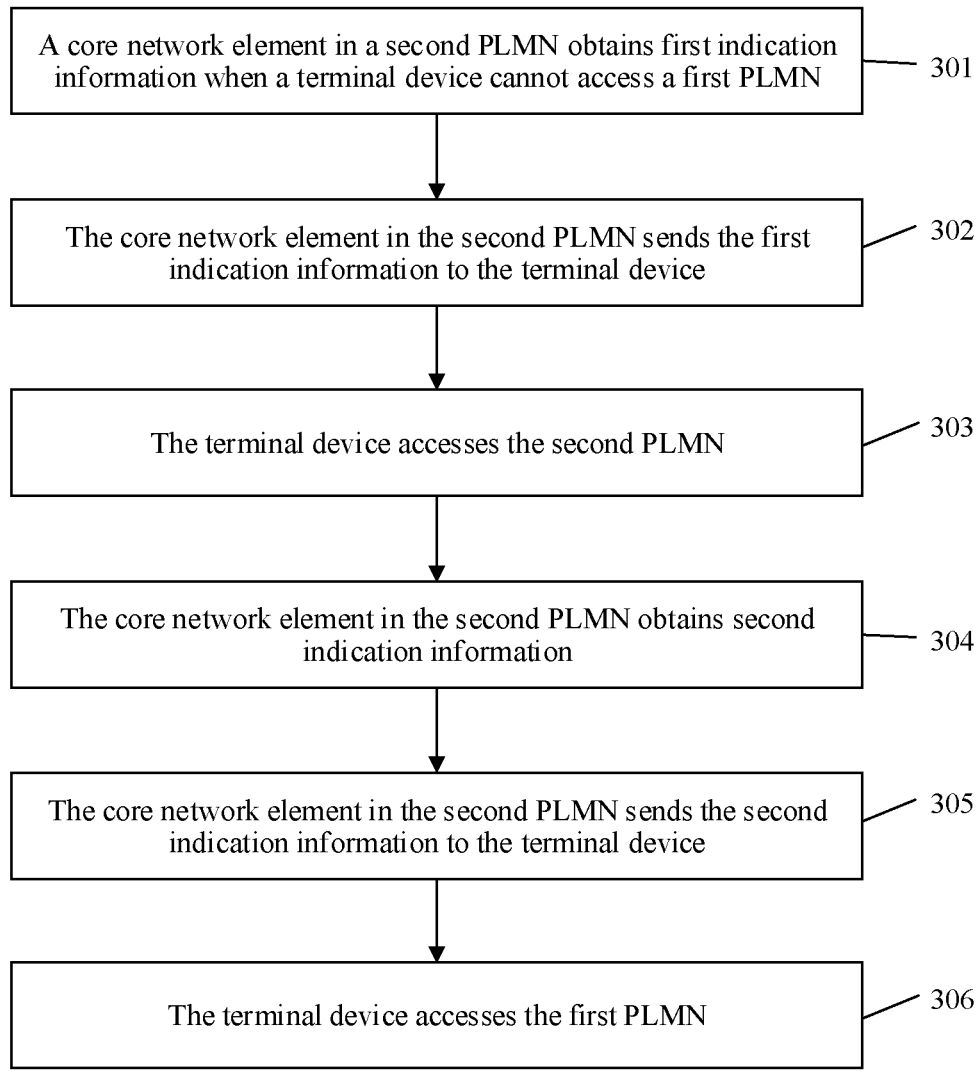
FIG. 3 is a schematic diagram of a roaming method according to an embodiment.

FIG. 3 is a schematic diagram of a roaming method according to an embodiment of this application. The roaming method includes the following steps.

301. A core network element in a second PLMN obtains first indication information when a terminal device cannot access a first PLMN, where the first indication information is used to indicate to enable a dynamic roaming agreement between the first PLMN and the second PLMN.

In this embodiment of this application, the dynamic roaming agreement exists between the first PLMN and the second PLMN. In a possible implementation, that the dynamic roaming agreement exists between the first PLMN and the second PLMN includes: if the terminal device can access the first PLMN, a roaming agreement between the first PLMN and the second PLMN is disabled; if the terminal device cannot access the first PLMN, a roaming agreement between the first PLMN and the second PLMN is enabled. For example, the first PLMN may be an HPLMN of the terminal device, and the second PLMN may be a VPLMN of the terminal device.

If the terminal device can access the first PLMN, that a roaming agreement between the first PLMN and the second PLMN is disabled may mean that no roaming agreement exists between the first PLMN and the second PLMN, or the roaming agreement between the first PLMN and the second PLMN is unavailable.

If the terminal device cannot access the first PLMN, that a roaming agreement between the second PLMN and the first PLMN is enabled may mean that the roaming agreement exists between the first PLMN and the second PLMN, or the roaming agreement between the first PLMN and the second PLMN is available.

It may be understood as: A temporary roaming agreement exists between the first PLMN and the second PLMN, and if the terminal device can access the first PLMN, the temporary roaming agreement is invalid, if the terminal device cannot access the first PLMN, the temporary roaming agreement is valid.

In another possible implementation, that the dynamic roaming agreement exists between the first PLMN and the second PLMN includes: if a first condition is satisfied, the roaming agreement between the first PLMN and the second PLMN is valid. The first condition may be that a faulty occurs in the first PLMN, or the terminal device cannot access the first PLMN.

In this application, the dynamic roaming agreement may also be referred to as the temporary roaming agreement. This is not limited in this application.

In this application, the core network element is an access management network element. When the first PLMN and the second PLMN use a 5G network architecture, the access management network element may be an AMF network element. When the first PLMN and the second PLMN use a 4G network architecture, the access management network element may be a mobility management entity (mobility management entity, MME). In this embodiment of this application, an example in which the access management network element is the AMF network element is used for description.

In a possible implementation, the core network element in the second PLMN obtains a first notification message, where the first notification message includes the first indication information. When the core network element is the AMF network element, the AMF network element may obtain the first notification message from a network management network element (for example, an OAM network element) by using a network exposure function network element in the second PLMN. Alternatively, the AMF network element may directly obtain the first notification message from the OAM network element. This is not limited in this embodiment of this application.

In a possible implementation, when the fault occurs in the first PLMN, an OAM system of the first PLMN may send an indication message to an OAM system of the second PLMN 2, to indicate to enable the dynamic roaming agreement between the first PLMN and the second PLMN. In another possible implementation, the dynamic roaming agreement between the first PLMN and the second PLMN may be enabled by the second PLMN. For example, when the second PLMN learns that the fault occurs in the first PLMN, the OAM system of the second PLMN determines to enable the dynamic roaming agreement between the first PLMN and the second PLMN.

In a possible implementation, the first notification message further includes information of the first PLMN. The information of the first PLMN may include identification information of the first PLMN. In this way, the terminal device can determine the PLMN that has the dynamic roaming agreement with the second PLMN. Specifically, the identification information of the first PLMN may be an identifier (identify, ID) of the first PLMN.

In a possible implementation, the first notification message further includes information of an area that is in the second PLMN and that the terminal device is allowed to access. Specifically, the information of the area may be a tracking area (Tracking Area, TA) identifier list (TA list), and the list includes one or more tracking area identifiers. For example, the information of the area may be information of an area, in an area that is in the first PLMN and in which a fault occurs, in the second PLMN that the terminal device is allowed to access the second PLMN. It may be understood that there is an overlapping area between the area that is in the second PLMN and that the terminal device is allowed to access the second PLMN and the area that is in the first PLMN and in which the fault occurs. In this way, a terminal device located in the area that is in the first PLMN and in which the fault occurs may be allowed to access the second PLMN without moving, thereby improving service experience of the terminal device.

In a possible implementation, the first notification message may further include policy information by using which the terminal device accesses the second PLMN. The policy information includes at least one of the following information: an access technology type by using which the terminal device is allowed to access the second PLMN and priority information of the second VPLMN. The priority information of the second PLMN may be understood as a priority of accessing the second PLMN by the terminal device or a rank of accessing the second PLMN by the terminal device in a plurality of PLMNs that the terminal device sequentially attempts to access. The priority information of the second PLMN may alternatively be referred to as a priority of the second PLMN in a network selection list of the terminal device. This is not limited herein.

In a possible implementation, the access technology type by using which the terminal device is allowed to access the second PLMN includes a 3rd generation partnership project (3rd Generation Partnership Project, 3GPP) access technology and/or a non-3GPP (Non-3GPP) access technology.

In a possible implementation, the priority information of the second PLMN includes that a priority of the second PLMN is lower than a priority of any one of the following PLMNs: a priority of the first PLMN, a priority of an equivalent PLMN (Equivalent PLMN, EPLMN) of the first PLMN, a priority of a user controlled PLMN (User Controlled PLMN), and a priority of an operator controlled PLMN (Operator Controlled PLMN). When the terminal device attempts to access a PLMN, a network selection rank of the terminal device is: (1) the first PLMN, (2) the equivalent PLMN of the first PLMN, (3) the user controlled PLMN, (4) the operator controlled PLMN, and (5) the second PLMN. That is, when the terminal device sequentially attempts to access: (1) the first PLMN, (2) the equivalent PLMN of the first PLMN, (3) the user controlled PLMN, and (4) the operator controlled PLMN, but the access fails, the terminal device may attempt to access the second PLMN.

In another possible implementation, the priority information of the second PLMN includes that the priority of the second PLMN is higher than a priority of a PLMN selected by a user based on a quality of service requirement, or the priority of the second PLMN is lower than a priority of the operator controlled PLMN and higher than a priority of a PLMN selected by a user based on a quality of service requirement. When the terminal device cannot access the operator controlled PLMN, the terminal device may attempt to access the second PLMN. If the terminal device cannot access the second PLMN, the terminal device may attempt to access the PLMN selected by the user based on the quality of service requirement.

In a possible implementation, when there are a plurality of second PLMNs, the priority information of the second PLMN may further include priorities of the plurality of second PLMNs.

302. The core network element sends the first indication information to the terminal device.

In a possible implementation, the core network element determines an access network device based on the information of the area that is in the second PLMN and that the terminal device is allowed to access. The access network device is located in the area that is in the second PLMN and that the terminal device is allowed to access. The core network element sends the first indication information to the terminal device by using the determined access network device. For example, if the area that is in the second PLMN and that the terminal device is allowed to access includes a plurality of access network devices, the plurality of access network devices may simultaneously send broadcast messages to the terminal device.

In a possible implementation, the access network device sends the broadcast message to the terminal device. The broadcast message includes the first indication information. The broadcast message may further include the identification information of the first PLMN. In this way, the terminal device can determine the PLMN that has the dynamic roaming agreement with the second PLMN.

In a possible implementation, the broadcast message further includes the information of the area that is in the second PLMN and that the terminal device is allowed to access. For details of the information of the area, refer to the descriptions of 301.

In a possible implementation, the broadcast message may further include policy information by using which UE accesses the second PLMN. For details of the policy information, refer to the descriptions of 301.

303. The terminal device accesses the second PLMN.

Specifically, the terminal device accesses the second PLMN based on the first indication information.

In a possible implementation, the terminal device may determine the first PLMN as an HPLMN based on the identification information of the first PLMN included in the broadcast message. Then, the terminal device sends an access request message to the second PLMN based on the first indication information. The access request message may be a registration request (registration request) message.

In a possible implementation, the terminal device sends the access request message to the second PLMN based on the received policy information by using which the second PLMN is accessed. For example, the terminal device determines, based on the policy information, an access technology to be selected to send the access request message to the second PLMN. For another example, the terminal device determines the priority of the second PLMN based on the policy information, and then sends the access request message to the second PLMN based on the priority of the second PLMN.

Based on the foregoing operations 301 to 303, when the terminal device cannot access the first PLMN because the fault occurs in the first PLMN, the terminal device may access the second PLMN.

When the fault in the first PLMN is recovered, the following operations 304 to 306 may be performed to enable the terminal device to re-access the first PLMN.

304. The core network element in the second PLMN obtains second indication information, where the second indication information is used to indicate to disable the dynamic roaming agreement between the second PLMN and the first PLMN.

In a possible implementation, the core network element in the second PLMN obtains a second notification message, where the second notification message includes the second indication information. A manner that the core network element obtains the second notification message is similar to a manner that the core network element obtains the first notification message. For details, refer to the descriptions of 301.

In a possible implementation, when the fault in the first PLMN is recovered, the OAM system of the first PLMN may send the indication message to the OAM system of the second PLMN, to indicate to disable the dynamic roaming agreement between the first PLMN and the second PLMN. In another possible implementation, the dynamic roaming agreement between the first PLMN and the second PLMN may be disabled by the second PLMN. For example, when the second PLMN learns that the fault in the first PLMN is recovered, the OAM system of the second PLMN determines to disable the dynamic roaming agreement between the first PLMN and the second PLMN.

In a possible implementation, the second notification message further includes the information of the first PLMN. The information of the first PLMN may include the identification information of the first PLMN. In this way, the terminal device may determine that the terminal device cannot dynamically roam to the second PLMN.

In a possible implementation, the second notification message further includes information of an area that is in the second PLMN and that the terminal device is not allowed to access. Specifically, the information of the area may be a tracking area identifier list (TA list), and the list includes one or more tracking area identifiers. For example, the information of the area may be information of an area that is in the second PLMN and that the terminal device is not allowed to access the second PLMN after the fault in the first PLMN is recovered.

It should be noted that, the information of the area that is in the second PLMN and that the terminal device is allowed to access the second PLMN in step 302 may be completely the same as, partially the same as, or completely different from the information of the area that is in the second PLMN and that the terminal device is not allowed to access in step 304. For example, for ease of description, the area that is in the second PLMN and that the terminal device is allowed to access the second PLMN is referred to as a first area, and the first area includes a first tracking area identifier list; and the area that is in the second PLMN and that the terminal device is not allowed to access is referred to a second area, and the second area includes a second tracking area identifier list. One or more tracking area identifiers in the first tracking area identifier list may be completely the same as, partially the same as, or completely different from one or more tracking area identifiers in the second tracking area identifier list. This is not limited in the present invention.

305. The core network element sends the second indication information to the terminal device.

In a possible implementation, the core network element determines an access network device based on the information of the area that is in the second PLMN and that the terminal device is not allowed to access. The access network device is located in the area that is in the second PLMN and that the terminal device is not allowed to access. The core network element sends the second indication information to the terminal device by using the determined access network device.

The core network element sends the second indication information to the access network device. The access network device may send the second indication information to the terminal device in the following two manners.

Manner 1

The access network device sends the broadcast message to the terminal device. The broadcast message includes the second indication information. Further, the broadcast message may further include the identification information of the first PLMN. The terminal device may determine the first PLMN as an HPLMN based on the identification information of the first PLMN. In this way, the terminal device may determine that the terminal device cannot dynamically roam to the second PLMN.

In a possible implementation, if the area that is in the second PLMN and that the terminal device is not allowed to access includes a plurality of access network devices, the plurality of access network devices may simultaneously send broadcast messages to the terminal device.

In a possible implementation, the broadcast message further includes the information of the area that is in the second PLMN and that the terminal device is not allowed to access. Specifically, the information of the area may be a tracking area identifier list (TA list), and the list includes one or more tracking area identifiers.

After receiving the broadcast message, the terminal device sends a deregistration request (deregistration request) message to the second PLMN, to enable the terminal device to deregister from the second PLMN.

Manner 2

The access network device sends a deregistration request message to the terminal device. The deregistration request message includes the second indication information.

In a possible implementation, the deregistration request message further includes the information of the area that is in the second PLMN and that the terminal device is not allowed to access. For details, refer to the descriptions of Manner 1.

306. The terminal device accesses the first PLMN.

Specifically, the terminal device sends an access request message to the first PLMN based on the second indication information, to access the first PLMN. The access request message may be a registration request message.

In this embodiment of this application, if the terminal device cannot access the first PLMN because a fault occurs in the first PLMN, the terminal device sends an access request to the second PLMN based on the first indication information from the second PLMN, to reduce service waiting time of the terminal device, and improve service experience of a user. Further, after the fault in the first PLMN is recovered, the terminal device sends an access request to the first PLMN based on the second indication information from the second PLMN, to enable the terminal device to return to the first PLMN in time.

The following describes the roaming method in this embodiment of this application in detail by using an example in which the first PLMN is an HPLMN, the second PLMN is a VPLMN, and the terminal device is UE. The HPLMN includes an access network device RAN 1 and an access management network element AMF 1. The VPLMN includes an access network device RAN 2, an access management network element AMF 1, an NEF network element, and an OAM network element. Certainly, the HPLMN and the VPLMN may alternatively include other network elements. This is not limited herein.

Figure 4:
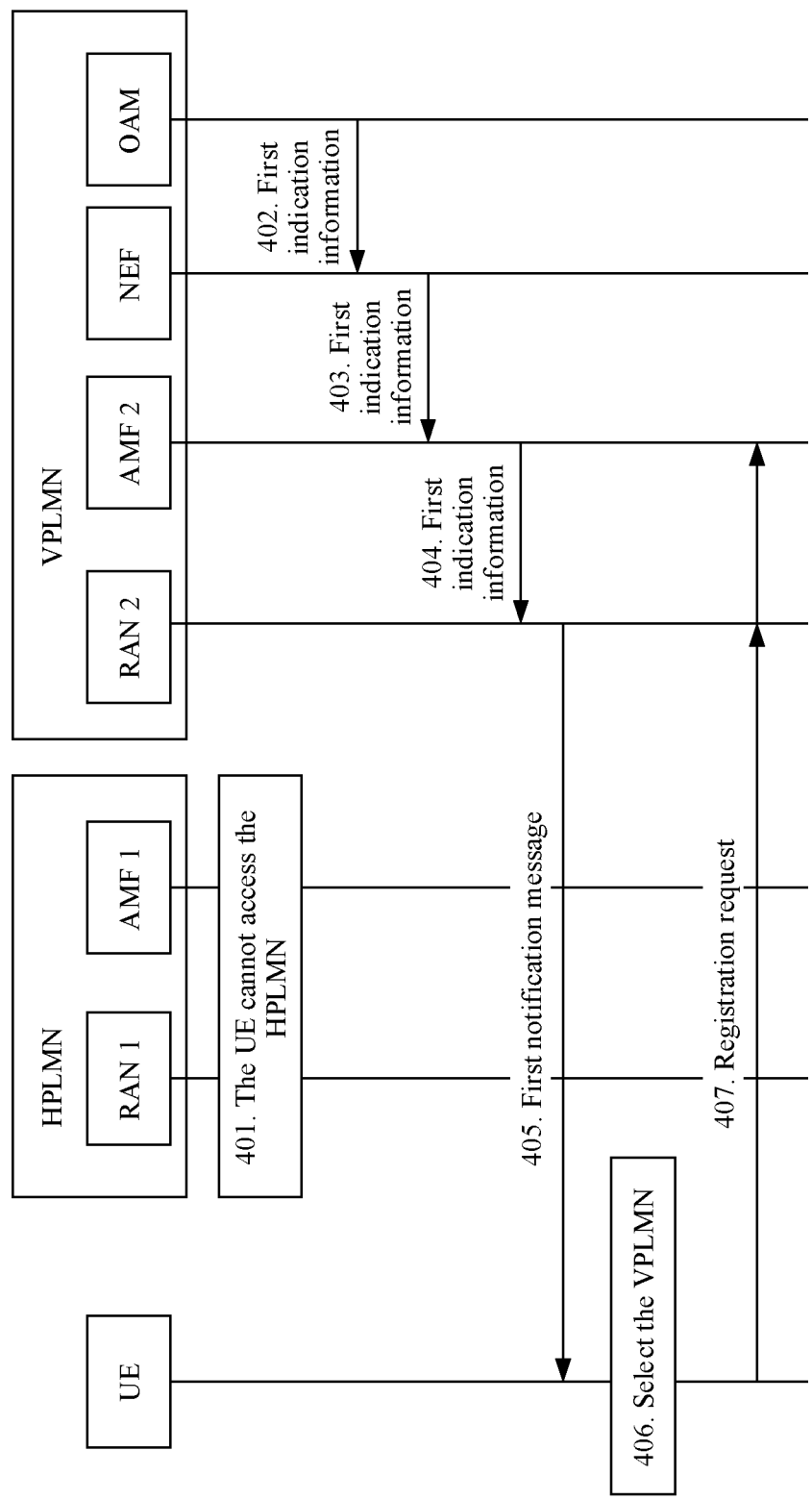
FIG. 4 is a schematic diagram of another roaming method according to an embodiment.

In an embodiment shown in FIG. 4, when a fault occurs in the HPLMN, the VPLMN enables dynamic roaming agreement with the HPLMN. Specifically, the method includes the following steps.

401. The UE cannot access the HPLMN.

After the UE initially accesses the HPLMN, the UE cannot access the HPLMN if the fault occurs in the HPLMN.

402. The OAM network element sends first indication information to the NEF network element.

When the VPLMN learns that the HPLMN cannot be accessed due to the fault, the VPLMN enables the dynamic roaming agreement between the VPLMN and the HPLMN, to allow the UE in the HPLMN to access the VPLMN. In a possible implementation, the OAM network element in the VPLMN obtains a first notification message by using a third party or directly from the HPLMN, and sends the first notification message to the NEF network element. The first notification message includes the first indication information. The first indication information is used to indicate to enable the dynamic roaming agreement between the HPLMN and the VPLMN. The first notification message may further include identification information of the HPLMN. The VPLMN to which the UE is allowed to roam can be determined by using the identification information of the HPLMN.

In a possible implementation, the first notification message further includes information of an area that is in the VPLMN and that the terminal device is allowed to access, and/or policy information by using which the UE accesses the VPLMN. For details of the information of the area that is in the VPLMN and that the terminal device is allowed to access and the policy information by using which the UE accesses the VPLMN, refer to the information of the area that is in the second PLMN and that the terminal device is allowed to access and the policy information by using which the UE accesses the second PLMN in 301.

403. The NEF network element sends the first indication information to the AMF 2 network element.

In a possible implementation, after receiving the first notification message from the OAM network element, the NEF network element determines the corresponding AMF 2 based on the information of the area that is in the VPLMN and that the terminal device is allowed to access. A service area of the AMF 2 is included in the area that is in the VPLMN and that the terminal device is allowed to access. Specifically, the NEF network element may find an identifier of the AMF 2 based on a network topology. The NEF network element sends the first indication information to the AMF 2 network element.

In a possible implementation, the NEF network element sends the first notification message to the AMF 2, where the first notification message includes the first indication information. The first notification message may further include at least one of the following content: the identification information of the HPLMN, the information of the area that is in the VPLMN and that the terminal device is allowed to access, and the policy information by using which the UE accesses the VPLMN. For details, refer to the descriptions of 402.

In a possible implementation, the OAM network element in step 402 may further find the identifier of the AMF 2 based on the network topology, and directly send the first indication information to the AMF 2.

404. The AMF 2 network element sends the first indication information to the RAN 2.

In a possible implementation, after receiving the first notification message from the NEF network element or the OAM network element, the AMF 2 network element determines the corresponding RAN 2 based on the information of the area that is in the VPLMN and that the terminal device is allowed to access. A service area of the RAN 2 is included in the area that is in the VPLMN and that the terminal device is allowed to access. Specifically, the AMF 2 network element may find an identifier of the RAN 2 based on the network topology. The AMF 2 network element sends the first indication information to the RAN 2.

In a possible implementation, the AMF 2 network element sends the first notification message to the RAN 2. The first notification message may further include at least one of the following content: the identification information of the HPLMN, the information of the area that is in the VPLMN and that the terminal device is allowed to access, and the policy information by using which the UE accesses the VPLMN. For details, refer to the descriptions of 402.

405. The RAN 2 network element sends a notification message to the UE.

In a possible implementation, after receiving the first indication information, the RAN 2 sends a broadcast message to the UE based on the first indication information. The notification message is the broadcast message. The broadcast message includes the first indication information.

In a possible implementation, the broadcast message further includes at least one of the following content: the identification information of the HPLMN, the information of the area that is in the VPLMN and that the terminal device is allowed to access, and the policy information by using which the UE accesses the VPLMN. For details, refer to the descriptions of 402.

406. The UE selects the VPLMN.

In a possible implementation, after the UE receives the broadcast message, if an HPLMN in the broadcast message is the same as an HPLMN to which the UE belongs, the UE selects to access the VPLMN by using corresponding policy information.

In a possible implementation, if the policy information includes priority information of the VPLMN, the UE selects to access the VPLMN based on a priority rank of the VPLMN. For another example, if the policy information includes an access technology type, the UE accesses the VPLMN by using a corresponding access technology type.

407. The UE sends a registration request message to the AMF 2 in the VPLMN.

Based on the foregoing operations 401 to 407, after a fault occurs in the HPLMN to which the UE belongs, the UE may access the VPLMN having a dynamic roaming agreement with the HPLMN.

Figure 5:
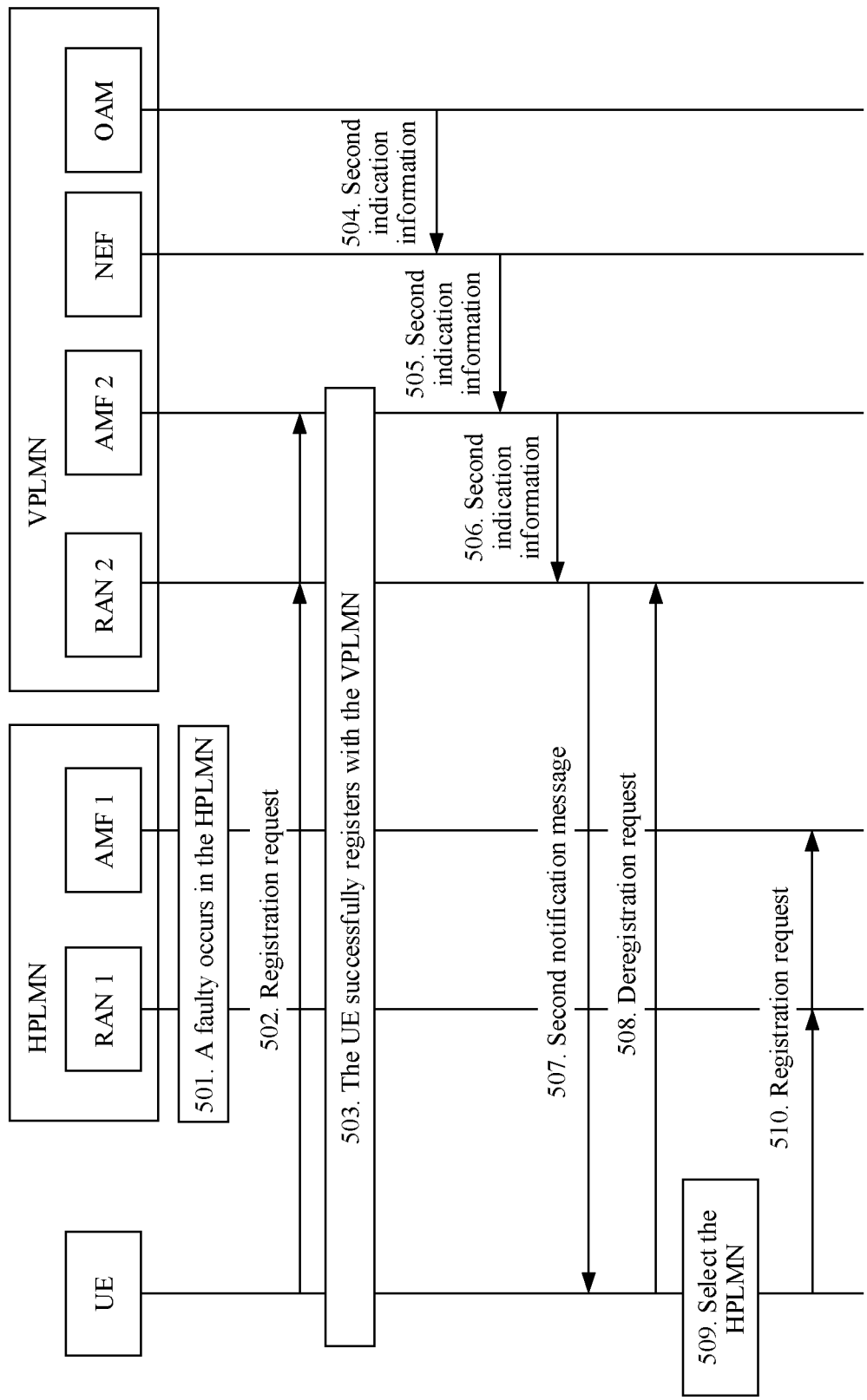
FIG. 5 is a schematic diagram of still another roaming method according to an embodiment.

When the fault in the HPLMN is recovered, an embodiment shown in FIG. 5 provides a method for returning, by the UE, from the VPLMN to the HPLMN. Specifically, the method includes the following steps.

501 to 503. After the fault occurs in the HPLMN, the UE cannot access the HPLMN, and the UE may successfully access the VPLMN by using the method in the embodiment shown in FIG. 4. For details, refer to the descriptions of steps 401 to 407.

504. The OAM network element sends second indication information to the NEF network element.

When the VPLMN learns that the fault in the HPLMN is recovered, the VPLMN disables the dynamic roaming agreement between the VPLMN and the HPLMN, and forbids the UE in the HPLMN to access the VPLMN. In a possible implementation, the OAM network element obtains a second notification message by using a third party or directly from the HPLMN. The second notification message includes the second indication information. The second indication information is used to indicate to disable the dynamic roaming agreement between the HPLMN and the VPLMN. The second notification message may further include the identification information of the HPLMN. The VPLMN to which the UE is disallowed to roam can be determined by using the identification information of the HPLMN.

In a possible implementation, the second notification message further include information of an area that is in the VPLMN and that the terminal device is not allowed to access. For example, the information of the area that is in the VPLMN and that the terminal device is not allowed to access may be a tracking area identifier list (TA list), and the list includes one or more tracking area identifiers.

505. The NEF network element sends the second indication information to the AMF 2 network element.

In a possible implementation, after receiving the second notification message from the OAM network element, the NEF network element determines the corresponding AMF 2 based on the information of the area that is in the VPLMN and that the terminal device is not allowed to access. The service area of the AMF 2 is included in the area that is in the VPLMN and that the terminal device is not allowed to access. Specifically, the NEF network element may find an identifier of the AMF 2 based on a network topology. The NEF network element sends the second indication information to the AMF 2 network element.

In a possible implementation, the NEF network element sends the second notification message to the AMF 2, where the second notification message includes the second indication information. The second notification message may further include at least one of the following content: the identification information of the HPLMN and the information of the area that is in the VPLMN and that the terminal device is not allowed to access. For details, refer to the descriptions of 504.

In a possible implementation, the OAM network element in step 504 may further find the identifier of the AMF 2 based on the network topology, and directly send the second indication information to the AMF 2.

506. The AMF 2 network element sends the second indication information to the RAN 2.

In a possible implementation, after receiving the second notification message from the NEF network element or the OAM network element, the AMF 2 network element determines the corresponding RAN 2 based on the information of the area that is in the VPLMN and that the terminal device is not allowed to access. The service area of the RAN 2 is included in the area that is in the VPLMN and that the terminal device is not allowed to access. Specifically, the AMF 2 network element may find the identifier of the RAN 2 based on the network topology. The AMF 2 network element sends the second indication information to the RAN 2.

In a possible implementation, the AMF 2 network element sends the second notification message to the RAN 2. The second notification message may further include at least one of the following content: the identification information of the HPLMN and the information of the area that is in the VPLMN and that the terminal device is not allowed to access. For details, refer to the descriptions of 504.

507. The RAN 2 network element sends the second notification message to the UE.

In a possible implementation, after receiving the second indication information, the RAN 2 sends a broadcast message to the UE based on the second indication information. The second notification message is the broadcast message. The broadcast message includes the second indication information.

In a possible implementation, the broadcast message further includes at least one of the following content: the identification information of the HPLMN and the information of the area that is in the VPLMN and that the terminal device is not allowed to access. For details, refer to the descriptions of 504.

508. The UE sends a deregistration request message to the AMF 2.

In a possible implementation, after the UE receives the broadcast message, if an HPLMN in the broadcast message is the same as an HPLMN of the UE, the UE learns, based on the second indication information, that the dynamic roaming agreement between the HPLMN and the VPLMN is disabled. Therefore, the UE sends the deregistration request message to the AMF 2, to trigger the UE to detach from the VPLMN.

509. The UE selects the HPLMN.

In a possible implementation, after receiving the broadcast message, the UE learns, based on the second indication information, that the dynamic roaming agreement between the HPLMN and the VPLMN is disabled. The UE may select, based on a PLMN selection list stored in the UE, to access the HPLMN.

510. The UE sends a registration request message to the AMF 1 in the HPLMN.

Based on the foregoing operations 504 to 510, when the fault in the HPLMN is recovered, the UE may return to the HPLMN from the VPLMN.

Figure 6:
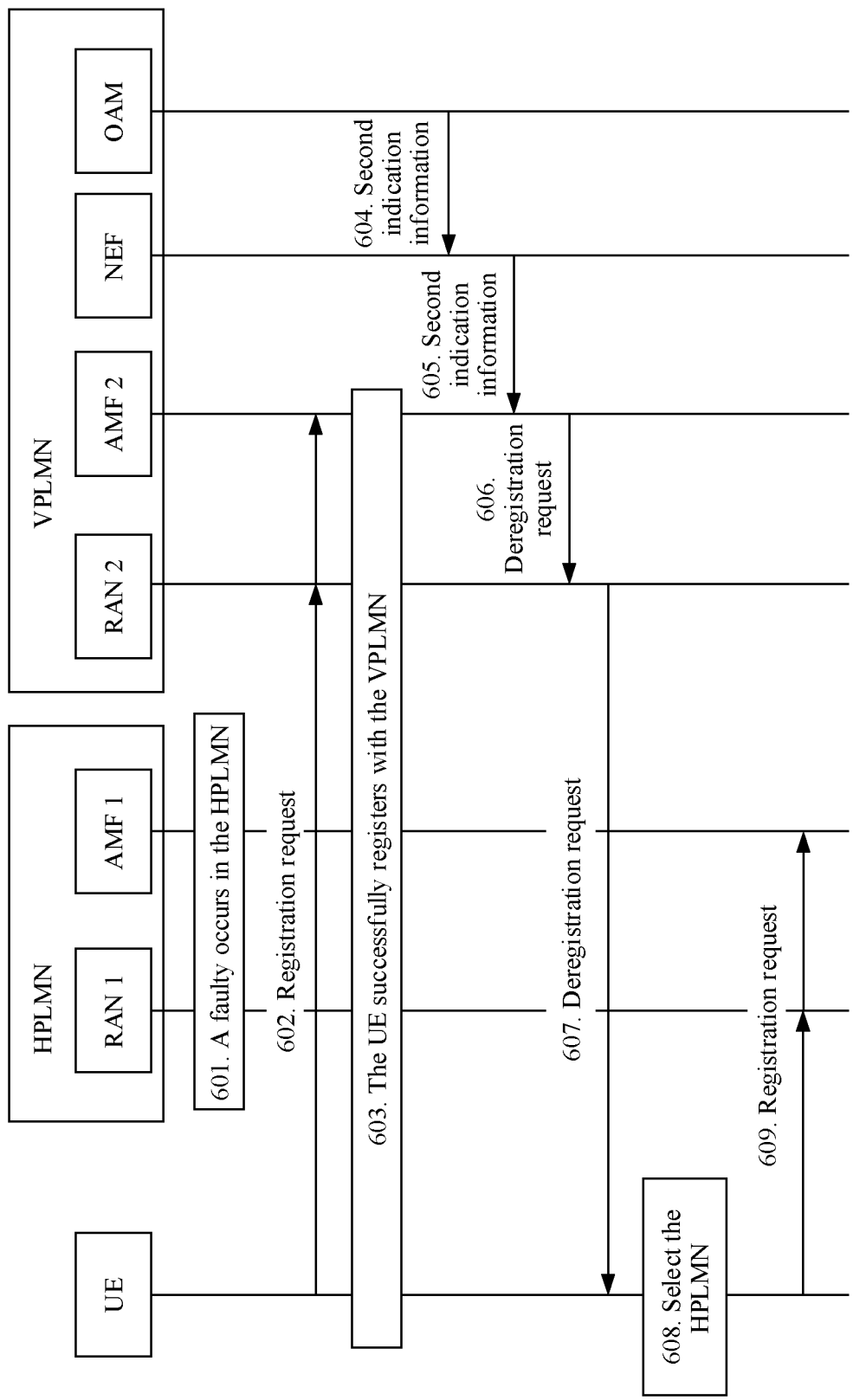
FIG. 6 is a schematic diagram of yet another roaming method according to an embodiment.

When the fault in the HPLMN is recovered, an embodiment shown in FIG. 6 provides another method for returning, by the UE, from the VPLMN to the HPLMN. Specifically, the method includes the following steps.

For details of 601 to 605, refer to the descriptions of 501 to 505.

606. The AMF 2 network element sends the deregistration request message to the RAN 2.

In a possible implementation, after the AMF 2 network element receives the second notification message from the NEF network element or the OAM network element, the AMF 2 network element determines whether an HPLMN corresponding to UE currently registered with the AMF 2 is the same as the HPLMN included in the second notification message. If the HPLMN corresponding to UE currently registered with the AMF 2 is the same as the HPLMN included in the second notification message, the AMF 2 network element determines, based on the information of the area that is in the VPLMN and that the terminal device is not allowed to access included in the second notification message, whether a current location of the UE belongs to the area. If the current location of the UE belongs to the area, the AMF 2 initiates a deregistration procedure to the UE. Specifically, the AMF 2 network element sends the deregistration request message to the RAN 2. The deregistration request message includes the second indication information.

In a possible implementation, the deregistration request message may further include at least one of the following content: the information of the area that is in the VPLMN and that the terminal device is not allowed to access. For details, refer to the descriptions of 504.

607. The RAN 2 network element sends the deregistration request message to the UE.

In a possible implementation, after receiving the deregistration request message, the RAN 2 sends the deregistration request message to the UE. The deregistration request message includes the second indication information.

After receiving the deregistration request message, the UE learns, based on the second indication information, that the dynamic roaming agreement between the HPLMN and the VPLMN is disabled. Therefore, the UE detach from the VPLMN.

For details of 608 and 609, refer to the descriptions of 509 and 510.

Based on the foregoing operations 604 to 609, when the fault in the HPLMN is recovered, the UE may alternatively return to the HPLMN from the VPLMN.

In a possible implementation, the PLMN selection list stored in the UE may include information of a dynamic roaming PLMN, as shown in Table 1.

TABLE 1

| PLMN Priority | PLMN List |
|---|---|
| 1 | HPLMN or EHPLM |
| 2 | User controlled PLMN |
| 3 | Operator controlled PLMN |
| 4 | Dynamic roaming PLMN |
| 5 | PLMN selected based on a quality of service requirement |
| 6 | Another PLMN |

In Table 1, network selection priorities of PLMNs are represented in descending order from 1 to 6. A PLMN ranking "1" corresponds to the highest network selection priority, and a PLMN ranking "6" corresponds to the lowest network selection priority. For example, the HPLMN or EHPLMN has the highest priority. The user controlled PLMN has the secondary highest priority. Further, Table 1 may further include an access technology type corresponding to the user controlled PLMN. The operator controlled PLMN has a third highest priority. Further, Table 1 may further include an access technology type corresponding to the operator controlled PLMN. The dynamic roaming PLMN refers to the second PLMN. The dynamic roaming PLMN has a fourth highest priority. After obtaining information of the second PLMN, the terminal device stores the information of the second PLMN in the dynamic roaming PLMN. The PLMN selected based on the quality of service requirement has the fifth highest priority. The PLMN selected based on the quality of service requirement means that the terminal device selects, based on signal quality and/or an access technology type of each PLMN, a PLMN that satisfies the quality of service requirement.

It should be noted that the information of the second PLMN (that is, the dynamic roaming PLMN in Table 1) is added to Table 1 only after the UE obtains the information of the second PLMN. It may be understood as: the dynamic roaming PLMN in Table 1 is dynamically generated by the terminal device based on the received information of the dynamic roaming PLMN. Before the UE obtains the information of the second PLMN, the PLMN selection list of the terminal device does not include the information of the second PLMN, that is, Table 1 does not include the information of the second PLMN. In this case, the terminal device does not consider the information of the second PLMN in a network selection process.

In a possible manner, content in the foregoing Table 1 may be stored in a subscriber identity module (Subscriber Identity Module, SIM) of the terminal device. In a possible implementation, if the terminal device accesses a PLMN through automatic network selection, the terminal device may sequentially select, based on the priorities of the PLMNs in Table 1, corresponding PLMNs to access.

In embodiments in FIG. 4 to FIG. 6, for details of same or similar content, refer to the descriptions of the embodiment in FIG. 3.

Figure 7:
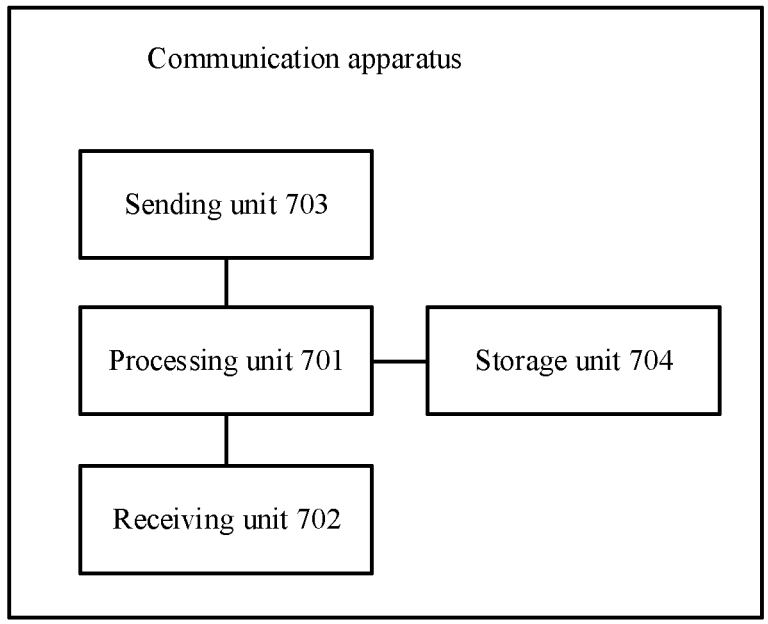
FIG. 7 is a schematic structural diagram of a communication apparatus according to an embodiment.

FIG. 7 is a schematic diagram of a communication apparatus according to an embodiment of this application. Specifically, the communication apparatus includes a processing unit 701, a receiving unit 702, and a sending unit 703. The communication apparatus may further include a storage unit 704. The processing unit 701, the receiving unit 702, the sending unit 703, and the storage unit 704 may be physically separated units, or may be integrated into one or more physical units. This is not limited herein.

The receiving unit 702 and the sending unit 703 are configured to exchange content between the processing unit 701 and another unit or network element. Specifically, the sending unit 703 may be a transmit circuit or a transmitter. The receiving unit 702 may be a receiving circuit or a receiver. The sending unit 703 and the receiving unit 702 may alternatively be a transceiver of the communication apparatus. The sending unit 703 and the receiving unit 702 may alternatively be a communication interface or a transceiver circuit of the processing unit 701. Optionally, the sending unit 703 and the receiving unit 702 may alternatively be a transceiver chip.

Although FIG. 7 shows only one sending unit 703 and one receiving unit 702, the communication apparatus may alternatively include a plurality of sending units 703 and a plurality of receiving units 702. The sending unit 703 and the receiving unit 702 may alternatively be a subunit of one or more transceiver units.

The processing unit 701 is used by the communication apparatus to process data. The processing unit 701 may be a processing circuit or may be a processor. The processor may be a central processing unit (CPU), a network processor (network processor, NP), or a combination of a CPU and an NP. The processor may further include a hardware chip. The hardware chip may be an application-specific integrated circuit (ASIC), a programmable logic device (programmable logic device, PLD), or a combination thereof. The PLD may be a complex programmable logic device (CPLD), a field-programmable gate array (FPGA), a generic array logic (GAL), or any combination thereof.

Although FIG. 7 shows only one processing unit 701, the communication apparatus may further include a plurality of processing units, or the processing unit 701 includes a plurality of data processing subunits. Specifically, the processor may be a single-core (single-CPU) processor, or may be a multi-core (multi-CPU) processor.

The storage unit 704 is configured to store computer instructions executed by the processing unit 701. The storage unit 704 may be a storage circuit or may be a memory. The memory may be a volatile memory or a non-volatile memory, or may include both a volatile memory and a non-volatile memory. The non-volatile memory may be a read-only memory ( ), a programmable read-only memory (PROM), an erasable programmable read-only memory (EPROM), an electrically erasable programmable read-only memory (EEPROM), or a flash memory. The volatile memory may be a random access memory (random access memory, RAM) used as an external buffer.

The storage unit 704 may be a unit independent of the processing unit 701, or may be a storage unit in the processing unit 701. This is not limited herein. Although FIG. 7 shows only one storage unit, the communication apparatus may alternatively include a plurality of storage units, or the storage unit includes a plurality of storage subunits.

In embodiments of this application, the processing unit 701 may exchange content with another network element by using the sending unit 703 and the receiving unit 702. For example, the processing unit 701 obtains or receives content from the another network element.

In a possible implementation, the processing unit 701, the sending unit 703, the receiving unit 702, and the storage unit 704 may be connected to each other by using a bus. The bus may be a peripheral component interconnect ( ) bus or an extended industry standard architecture (EISA) bus, or the like. The bus may be classified into an address bus, a data bus, a control bus, or the like.

The communication apparatus may be the terminal device in embodiments in FIG. 3 to FIG. 6. The communication apparatus includes: a processing unit, configured to enable the communication apparatus to access a second PLMN when the communication apparatus cannot access a first PLMN, where a dynamic roaming agreement between the second PLMN and the first PLMN is enabled; a receiving unit, configured to receive indication information from the second PLMN, where the indication information is used to indicate to disable the dynamic roaming agreement between the second PLMN and the first PLMN; and a sending unit, configured to send an access request message to the first PLMN based on the indication information.

In a possible implementation, the receiving unit is configured to receive a broadcast message from the second PLMN, where the broadcast message includes the indication information.

In a possible implementation, the broadcast message further includes identification information of the first PLMN, and/or information of an area that is in the second PLMN and that the communication apparatus is not allowed to access.

In a possible implementation, the processing unit is further configured to deregister the communication apparatus from the second PLMN.

In a possible implementation, the receiving unit is configured to receive a deregistration request message from the second PLMN, where the deregistration request message includes the indication information.

In a possible implementation, the deregistration request message further includes information of an area that is in the second PLMN and that the communication apparatus is not allowed to access.

In a possible implementation, the receiving unit is further configured to: before the communication apparatus accesses the second PLMN, receive, from the second PLMN, indication information used to indicate to enable the dynamic roaming agreement between the second PLMN and the first PLMN.

In a possible implementation, the receiving unit is further configured to obtain information of the second PLMN before the communication apparatus accesses the second PLMN.

In a possible implementation, the information of the second PLMN further includes at least one of the following information: an access technology type by using which the communication apparatus is allowed to access the second PLMN, information of an area that is in the second PLMN and that the communication apparatus is allowed to access, or priority information of the second PLMN.

In a possible implementation, the second PLMN and the first PLMN have a same mobile country code, and a mobile network code of the second PLMN is different from a mobile network code of the first PLMN.

In a possible implementation, the dynamic roaming agreement between the second PLMN and the first PLMN includes: if the communication apparatus can access the first PLMN, a roaming agreement between the second PLMN and the first PLMN is disabled; if the communication apparatus cannot access the first PLMN, a roaming agreement between the second PLMN and the first PLMN is enabled.

In a possible implementation, the first PLMN is a home public land mobile network HPLMN, and the second PLMN is a visited public land mobile network VPLMN.

In this embodiment, the receiving unit 702 is configured to perform a signal receiving operation of the terminal device in embodiments in FIG. 3 to FIG. 6. The sending unit 703 is configured to perform a signal sending operation of the terminal device in embodiments in FIG. 3 to FIG. 6. The processing unit 701 is configured to perform a signal processing operation of the terminal device in embodiments in FIG. 3 to FIG. 6. For details, refer to the descriptions of embodiments of FIG. 3 to FIG. 6.

In a possible implementation, the processing unit 701 enables, based on the computer instructions stored in the storage unit 704, the communication apparatus to perform the operations of the terminal device in embodiments of FIG. 3 to FIG. 6.

In another possible implementation, the communication apparatus may alternatively be an access management network element. The communication apparatus may include: a receiving unit, configured to obtain first indication information when a terminal device cannot access a first PLMN, where the first indication information is used to indicate to enable a dynamic roaming agreement between a second PLMN and the first PLMN, and the communication apparatus is an apparatus in the second PLMN; and a sending unit, configured to send the first indication information to the terminal device.

In a possible implementation, the receiving unit is configured to obtain a first notification message, where the first notification message includes the first indication information.

In a possible implementation, the first notification message further includes information of the first PLMN, and the information of the first PLMN includes identification information of the first PLMN.

In a possible implementation, the first notification message further includes at least one of the following information: an access technology type by using which the terminal device is allowed to access the second PLMN, information of an area that is in the second PLMN and that the terminal device is allowed to access, or priority information of the second PLMN.

In a possible implementation, the communication apparatus further includes a processing unit, configured to determine an access network device based on the information of the area that is in the second PLMN and that the terminal device is allowed to access, where the access network device is located in the area that is in the second PLMN and that the terminal device is allowed to access.

In a possible implementation, the receiving unit is configured to obtain the first notification message from a network management network element by using a network exposure function network element in the second PLMN.

In a possible implementation, the receiving unit is further configured to obtain second indication information, where the second indication information is used to indicate to disable the dynamic roaming agreement between the second PLMN and the first PLMN; and the sending unit is further configured to send the second indication information to the terminal device by using the access network device.

The communication apparatus may alternatively be the access management network element in FIG. 4 to FIG. 6, for example, the AMF 1 or the AMF 2. Correspondingly, the receiving unit 702 is configured to perform a signal receiving operation of the AMF network element in embodiments of FIG. 4 to FIG. 6. The sending unit 703 is configured to perform a signal sending operation of the AMF network element in embodiments of FIG. 4 to FIG. 6. The processing unit 701 is configured to perform a signal processing operation of the AMF network element in embodiments of FIG. 4 to FIG. 6. For details, refer to the descriptions of embodiments of FIG. 4 to FIG. 6.

In a possible implementation, the processing unit 701 enables, based on the computer instructions stored in the storage unit 704, the communication apparatus to perform the operations of the AMF network element in embodiments of FIG. 4 to FIG. 6.

Figure 8:
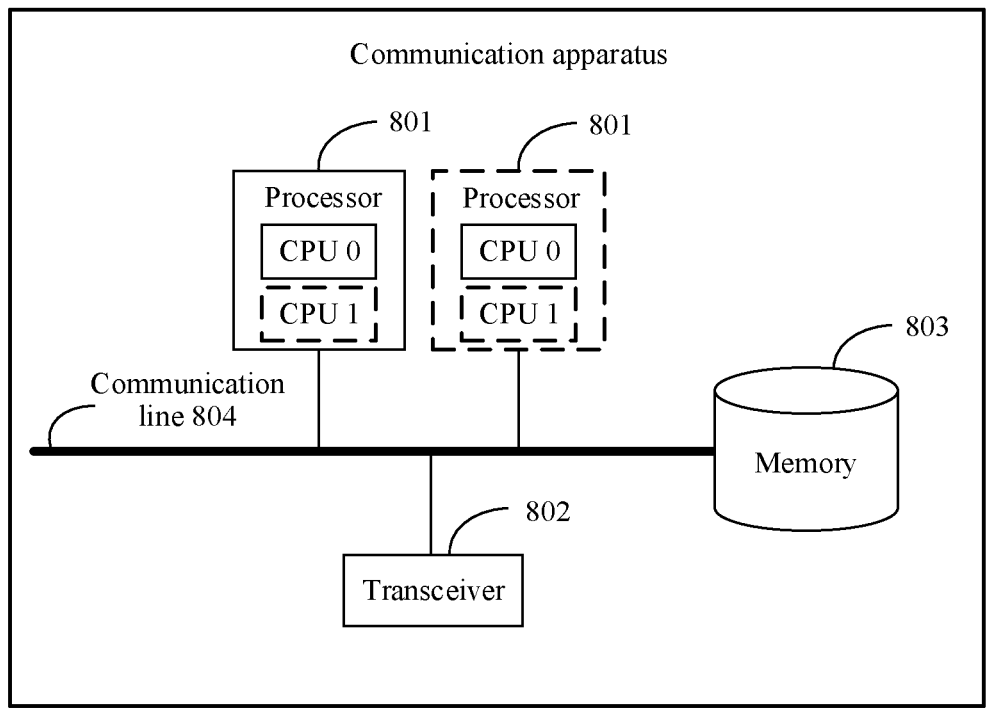
FIG. 8 is a schematic structural diagram of another communication apparatus according to an embodiment.

FIG. 8 is a schematic diagram of another communication apparatus according to an embodiment. The communication apparatus includes at least one processor 801, a transceiver 802, and a memory 803. The at least one processor 801, the transceiver 802, and the memory 803 are connected by using a communication line 804.

The processor 801 may be a CPU, a microprocessor, an ASIC, or one or more integrated circuits configured to control program execution in solutions of this application.

The memory 803 is configured to store computer-executable instructions for executing the solution of this application, and the processor 801 controls execution of the computer-executable instructions. The processor 801 is configured to execute the computer-executable instructions stored in the memory 803, to implement the operations of the terminal device or the AMF network element in embodiments in FIG. 3 to FIG. 6 of this application.

The computer-executable instructions in this embodiment of this application may also be referred to as application program code. This is not specifically limited in this embodiment of this application.

In an embodiment, the processor 801 may include one or more CPUs, for example, a CPU 0 and a CPU 1 in FIG. 7.

In an embodiment, the processor 801 may be a single-core (single-CPU) processor, or may be a multi-core (multi-CPU) processor.

Figure 9:
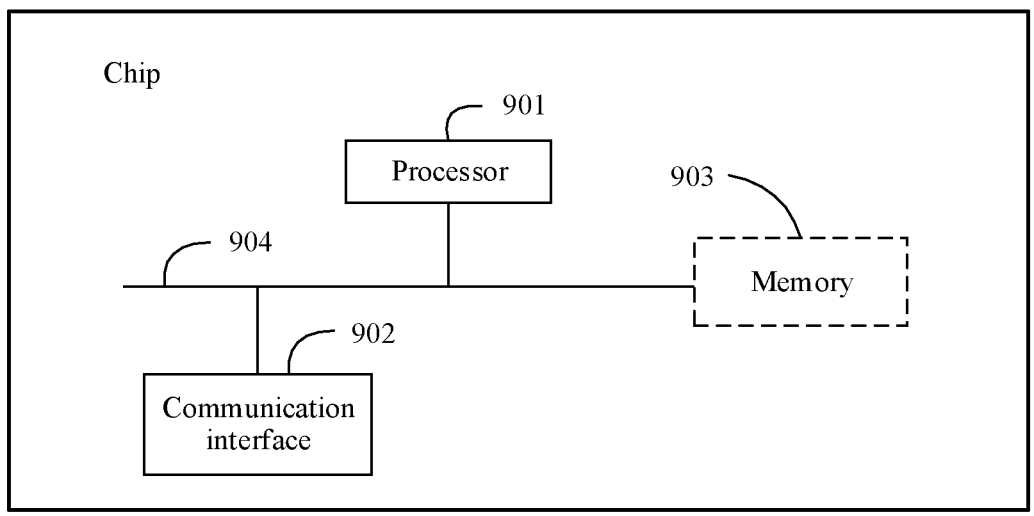
FIG. 9 is a schematic structural diagram of a chip or a chip system according to an embodiment.

FIG. 9 is a schematic structural diagram of a chip or a chip system according to an embodiment of this application. The chip includes one or more (including two) processors 901 and a communication interface 902.

The chip or the chip system may further include a memory 903. The memory 903 may include a read-only memory and a random access memory, and provide operation instructions and data for the processor 901.

In some implementations, the memory 903 stores the following elements: an execution module or a data structure, a subset thereof, or an extended set thereof.

In this embodiment, the operation instructions (the operation instructions may be stored in an operating system) stored in the memory 903 are invoked to control the terminal device or the AMF network element in embodiments in FIG. 3 to FIG. 6 to perform corresponding operations.

All or some of the foregoing embodiments may be implemented by using software, hardware, firmware, or any combination thereof. When the software is used to implement embodiments, all or some of embodiments may be implemented in a form of a computer program product. The computer program product includes one or more computer programs or instructions. When the computer programs or the instructions are loaded and executed on a computer, all or some of the procedure or functions according to embodiments of this application are implemented. The computer may be a general-purpose computer, a dedicated computer, a computer network, a network device, user equipment, or another programmable apparatus. The computer programs or the instructions may be stored in a computer-readable storage medium, or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid-state drive (SSD).

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of a plurality. A single processor or another unit may implement several functions listed in the claims. Some measures are recorded in dependent claims that are different from each other, but this does not mean that these measures cannot be combined to produce a better effect.

What is claimed is:

1. A roaming method, comprising:
    accessing, by a terminal device in accordance with a dynamic roaming agreement, a second public land mobile network (PLMN) in response to a fault occurring in a first PLMN, wherein the dynamic roaming agreement is activated between the second PLMN and the first PLMN;
    receiving, by the terminal device following recovery from the fault in the first PLMN, indication information from the second PLMN, the indication information indicates to deactivate the dynamic roaming agreement between the second PLMN and the first PLMN, wherein the receiving, by the terminal device, indication information from the second PLMN comprises receiving a deregistration request message from the second PLMN, the deregistration request message comprising the indication information, wherein the dynamic roaming agreement between the second PLMN and the first PLMN comprises: activating the dynamic roaming agreement between the first PLMN and the second PLMN when the fault occurs in the first PLMN, and activating deactivating the dynamic roaming agreement between the second PLMN and the first PLMN when the first PLMN is recovered; and
    sending, by the terminal device, an access request message to the first PLMN based on the indication information.

2. The method according to claim 1, wherein the deregistration request message further comprises information of an area that is in the second PLMN and that the terminal device is not permitted to access.

3. The method according to claim 1, comprising:
    receiving, by the terminal device from the second PLMN, indication information indicating to activate the dynamic roaming agreement between the second PLMN and the first PLMN.

4. The method according to claim 3, comprising:
    obtaining, by the terminal device, information of the second PLMN before the terminal device accesses the second PLMN.

5. The method according to claim 3, wherein the receiving, by the terminal device from the second PLMN, indication information indicating to activate the dynamic roaming agreement between the second PLMN and the first PLMN, comprises:
    receiving, by the terminal device, a broadcast message from an access network device in the second PLMN, wherein the broadcast message comprises the indication information indicating to activate dynamic roaming agreement between the second PLMN and the first PLMN.

6. The method according to claim 5, wherein the broadcast message comprises identification information of the first PLMN.

7. The method according to claim 4, the information of the second PLMN comprising at least one of the following: an access technology type by which the terminal device is permitted to access the second PLMN, information of an area that is included in the second PLMN and that the terminal device is permitted to access, or priority information of the second PLMN.

8. The method according to claim 1, wherein the second PLMN and the first PLMN have a common mobile country code, and a mobile network code of the second PLMN is different from a mobile network code of the first PLMN.

9. The method according to claim 1, wherein the first PLMN is a home public land mobile network (HPLMN) and the second PLMN is a visited public land mobile network (VPLMN).

10. An apparatus, comprising:
a processor; and
a memory coupled to the processor and configured to store computer instructions that, when executed by the processor, cause the apparatus to:
access a second public land mobile network (PLMN) in response to a fault occurring in a first PLMN, wherein a dynamic roaming agreement is activated between the second PLMN and the first PLMN;
receive, following recovery of the fault in the first PLMN, indication information from the second PLMN, wherein the indication information indicates to deactivate the dynamic roaming agreement between the second PLMN and the first PLMN, wherein the receiving indication information from the second PLMN comprises receiving from the second PLMN a deregistration request message comprising the indication information, wherein the dynamic roaming agreement between the second PLMN and the first PLMN comprises: activating the dynamic roaming agreement between the first PLMN and the second PLMN when the fault occurs in the first PLMN, and deactivating the dynamic roaming agreement between the second PLMN and the first PLMN when the first PLMN is recovered; and
send an access request message to the first PLMN based on the indication information.

11. The apparatus according to claim 10, wherein the computer instructions, when executed by the processor, further cause the apparatus to:
receive, from the second PLMN, indication information indicating conditions allow for activation of the dynamic roaming agreement between the second PLMN and the first PLMN.

12. The apparatus according to claim 11, wherein the computer instructions, when executed by the processor, further cause the apparatus to:
obtain information of the second PLMN before the apparatus accesses the second PLMN.

13. The apparatus according to claim 11, wherein the computer instructions, when executed by the processor, further cause the apparatus to:
receive a broadcast message from an access network device in the second PLMN, wherein the broadcast message comprises the indication information indicating conditions allow for activation of the dynamic roaming agreement between the second PLMN and the first PLMN.

14. The apparatus according to claim 13, wherein the broadcast message comprises identification information of the first PLMN.

15. The apparatus according to claim 10, wherein the second PLMN and the first PLMN have a same mobile country code, and a mobile network code of the second PLMN is different from a mobile network code of the first PLMN.

16. The apparatus according to claim 10, wherein the first PLMN is a home public land mobile network (HPLMN) and the second PLMN is a visited public land mobile network (VPLMN).

17. A non-transitory computer-readable storage medium storing computer-readable instructions that, when the instructions are run on a computer, the computer is enabled to perform operations including:
accessing a second public land mobile network (PLMN) in response to a fault occurring in a first PLMN, wherein a dynamic roaming agreement is activated between the second PLMN and the first PLMN;
receiving, following recovery of the fault in the first PLMN, indication information from the second PLMN, wherein the indication information indicates to deactivate the dynamic roaming agreement between the second PLMN and the first PLMN, wherein the receiving indication information from the second PLMN comprises receiving from the second PLMN a deregistration request message comprising the indication information, wherein the dynamic roaming agreement between the second PLMN and the first PLMN comprises activating the dynamic roaming agreement between the first PLMN and the second PLMN when the fault occurs in the first PLMN, and deactivating the dynamic roaming agreement between the second PLMN and the first PLMN when the first PLMN is recovered; and
sending an access request message to the first PLMN based on the indication information.

* * * * *